United States Patent

[11] 3,587,050

[72] Inventor Anthony C. Durante
Burlington, Mass.
[21] Appl. No. 854,379
[22] Filed Sept. 2, 1969
[45] Patented June 22, 1971
[73] Assignee Sylvania Electric Products, Inc.

[54] CODED OBJECT IDENTIFICATION SYSTEM AND SIGNAL PROCESSING MEANS
14 Claims, 6 Drawing Figs.

[52] U.S. Cl. 340/149, 340/167, 340/172
[51] Int. Cl. H04q 1/18
[50] Field of Search 340/149

[56] References Cited

UNITED STATES PATENTS 2,482,242 9/1949 Brostman 340/149 A

*Primary Examiner*—Harold I. Pitts
*Attorneys*—Norman J. O'Malley, Elmer J. Nealon and Peter Xiarhos

ABSTRACT: A coded object identification system having a relatively wide depth of field. A scanning unit is arranged to scan coded retroreflective labels affixed to objects, such as trucks, moving past the scanning unit and presenting labels to be "read" by the scanning unit from within a range of distances of 7—13 feet from the scanning unit. Coded pulses derived as a result of scanning a label within the 7—13 foot range of distances are applied by the scanning unit to a "near-depth" signal processing arrangement adapted to process optimally coded pulses derived from a label located within a "-near-depth" range, for example, 7—10 feet from the scanning unit, and also to a "far-depth" signal processing arrangement adapted to process optimally coded pulses derived from a label located within a "far-depth" range, for example, 10—13 feet from the scanner. Both of the signal processing arrangements are adapted to process coded pulses derived from a label located at the approximate center of the 7—13 foot range of distances, for example, at approximately 9.5—10.5 feet.

While the label is in the 7—10 foot range or, alternatively, in the 10—13 foot range, the coded signals from the appropriate signal processing arrangement (or both, if the label is at approximately 9.5—10.5 feet) is gated to additional signal processing circuitry, for further processing, by means of an electro-optical arrangement including a pair of photoresponsive devices arranged to be illuminated during each scan cycle by light from the scanning unit, a light detector circuit connected to the photoresponsive devices, and a toggle flip-flop circuit operable under control of the light detector circuit to enable in alternation gating logic circuits provided in the "near-depth" and "far-depth" data processing channels.

The additional signal processing circuitry includes data storage circuitry, and a parity checking apparatus and a label data recognition arrangement for rejecting any incorrect or invalid data caused to be gated into the data storage circuitry by the electro-optical arrangement.

INVENTOR
ANTHONY C. DURANTE
BY Peter Xiarhos
AGENT

INVENTOR
ANTHONY C. DURANTE
BY
Peter Xiarhos
AGENT

INVENTOR
ANTHONY C. DURANTE
BY Peter Xiarhos
AGENT

CODED OBJECT IDENTIFICATION SYSTEM AND SIGNAL PROCESSING MEANS

BACKGROUND OF THE INVENTION

The present invention relates to an automatic-coded object identification system. More particularly, the present invention pertains to an automatic-coded vehicle identification system which has a relatively wide depth of field and which is particularly useful in identifying vehicles such as cars, trucks, and busses.

One well known automatic coded object identification system for deriving information from coded retroreflective labels affixed to objects, for example, railway vehicles, is described in detail in U.S. Pat. No. 3,225,177 to Francis H. Stites and Raymond Alexander, assigned to the same assignee as the present application. In the above-mentioned patented system, a railway vehicle is provided with a vertically oriented retroreflective label including, in a vertical array, a plurality of equal-width, rectangular, retroreflective orange, blue, and white stripes, and nonretroreflective black stripes. The stripes of the four colors are arranged in a plurality of selected paired combinations, in accordance with a two-position base-four code format, to represent the identity or other information pertaining to the vehicle. Distinguishable coded START and STOP stripe-pairs, representing START and STOP control words, respectively, are also provided at opposite ends of the array of stripe-pairs to respectively initiate and terminate processing of the data content of the label.

In the operation of the above-mentioned vehicle identification system, the vehicle moves on tracks along a horizontal path past a trackside optical scanning unit, and the various stripes of the coded retroreflective label affixed to the vehicle are scanned in succession, from bottom to top, by light directed from a suitable light source onto a rotating wheel having a plurality of mirrors positioned around the periphery thereof. The incident light directed onto each stripe of the label is retroreflected and returned along the path of the incident light to an optics assembly including a pair of photosensors which are selectively energized by the light retroreflected from the various label stripes. More particularly, an "orange-responsive" photocell is provided which produces an output signal in response to light retroreflected from either an orange stripe or a white stripe (white retroreflected light including an "orange" component), and a "blue-responsive" photocell is provided which produces an output signal in response to light retroreflected from either a blue stripe or a white stripe (white retroreflected light including a "blue" component). Thus, both photocells are energized simultaneously to produce respective output signals in response to light retroreflected from a white stripe. Neither photocell is energized to produce an output signal when a black stripe is scanned inasmuch, as previously stated, the black stripes are nonretroreflective.

The individual output signals produced by the orange-responsive and blue-responsive photocells are applied to respective "orange" and "blue" standardizer circuits. The "orange" and "blue" standardizer circuits operate to convert the output signals from the respective photocells to standardized output pulses having a constant amplitude and each having a first pulse width or a second pulse width. Specifically, the "orange" and "blue" standardizer circuits each produce standardized pulses of the first width in response to the respective orange-responsive and blue-responsive photocells receiving retroreflected light from both stripes of a stripe-pair and standardized pulses of the second width in response to the respective photocells receiving retroreflected light from only one of the stripes of a stripe-pair. Accordingly, because the stripes are of equal width, the first pulse width has a value approximately twice that of the second pulse width. Typical values for the first and second pulse widths in the above-described system are 15.8—31.2 microseconds and 7.3—15 microseconds, respectively, these values corresponding to a depth of field for the system of approximately 9—12 feet. The various standardized pulses of the first and second widths are applied to loading logic circuitry which loads the standardized pulses into data storage apparatus. The signals loaded into and stored in the data storage apparatus are then further processed to provide indications representative of the information encoded in the label to local or remote readout apparatus.

In actual practice, the above-described system, having the aforementioned depth of field of 9—12 feet, has operated satisfactorily to identify vehicles such as railway vehicles the movements of which are confined to a railroad track located a fixed distance from the trackside scanning unit (12 feet, for example). However, in certain nonrail applications, for example, in reading cars, trucks, or busses travelling on a roadway or through tollbooth areas, or in reading trucks or busses entering or leaving transportation terminals or depots, a depth of field greater than 9—12 feet is generally required to accommodate the relatively wide variations which can normally be expected in the distance between the vehicle and the scanning unit. For example, in a typical truck depot operation in which trucks are required to be identified as they enter or leave a depot over a 16-foot wide roadway located 7 feet from the scanning unit, a depth of field which is twice the aforementioned 9—12 foot depth of field, for example, 7—13 feet, may be required.

It is accordingly a principal object of the present invention to provide an object identification system which has a relatively wide depth of field and which is particularly suitable for identifying coded nonrail vehicles such as cars, trucks, and busses.

BRIEF SUMMARY OF THE INVENTION

Briefly, in accordance with the foregoing and other objects of the invention, a system which is particularly suitable for operation over a relatively wide depth of field is provided for processing information encoded in a label. In accordance with the present invention, an information sensing means is provided which is operative to sense the information encoded in the label and to produce and apply electrical signals representative of the information encoded in the label to a first signal processing means and also to a second signal processing means. The first signal processing means operates to process the signals produced by the information sensing means in a first predetermined manner and to apply the signals processed thereby to a first gating means, and the second signal processing means operates to process the signals produced by the information sensing means in a second predetermined manner and to apply the signals processed thereby to a second gating means. The first and second gating means are each operative in response to a control signal to gate the signals processed by the respective first or second signal processing means to an additional signal processing means for further processing. By way of example, the additional signal processing means may include a storage means for storing the signals gated by the first gating means or the second gating means, and means for examining the signals stored in the storage means to determined whether said signals satisfy certain preestablished criteria for valid label-derived signals. If said signals satisfy the preestablished criteria, the last-mentioned means operates to apply the signals stored in the storage means to an output apparatus.

The aforementioned control signal for gating the signals processed by the first signal processing means or the second signal processing means via the respective first or second gating means via the respective first or second gating means to the additional signal processing means is generated by a control signal generating means. More specifically, while the information sensing means operates to sense the information encoded in the label, the control signal generating means operates to generate and apply a control signal to the first gating means or to the second gating means to cause the processed signals received thereby to be gated to the additional signal processing means.

BRIEF DESCRIPTION OF THE DRAWINGS

The invention is more fully described in the following detailed description, taken in conjunction with the accompanying drawings in which.

GENERATION DESCRIPTION OF THE INVENTION—FIG. 1

Figure 1:
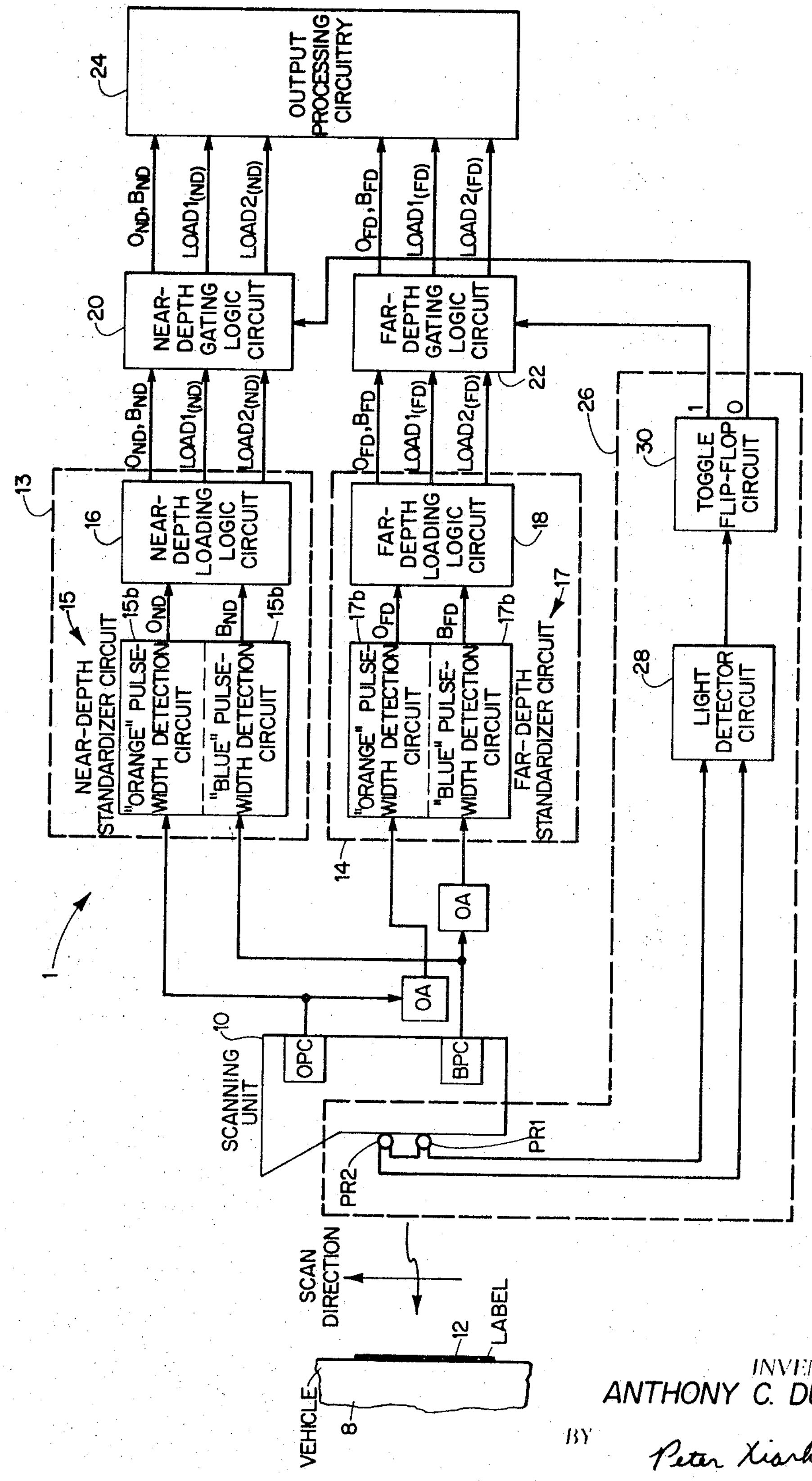
FIG. 1 is a diagrammatic representation in block diagram form of an automatic-coded vehicle identification system having relatively wide depth of field in accordance with the present invention.
Figures 2, 3:
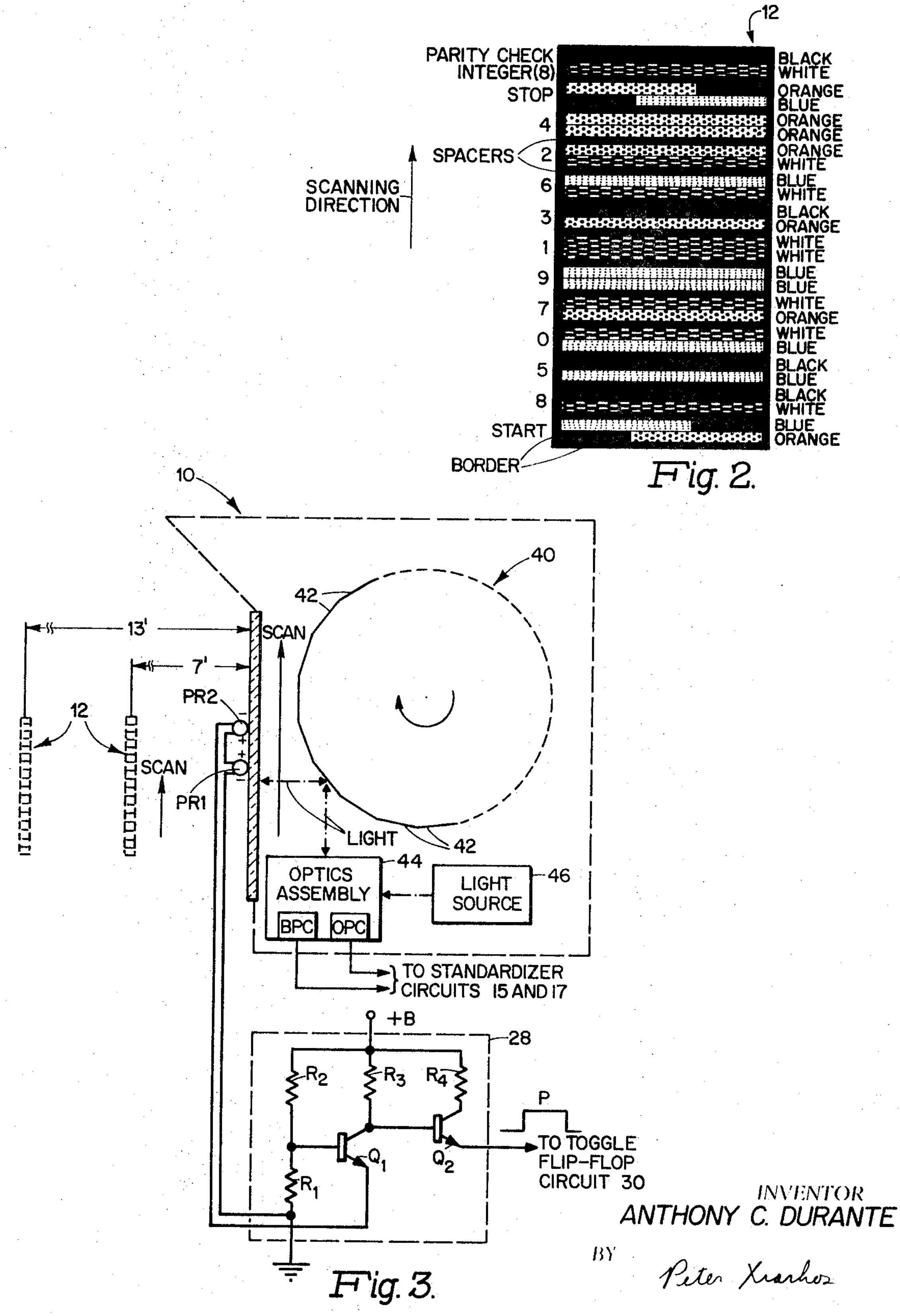
FIG. 2 is a diagrammatic representation of an exemplary two-position base-four coded retroreflective label which may be employed in the coded vehicle identification system of FIG. 1.
FIG. 3 is a diagrammatic representation of a scanning unit and an electro-optical arrangement which may be employed in the coded vehicle identification system of FIG. 1.

Referring to FIG. 1, there is shown in block diagram form an automatic-coded vehicle identification system 1 in accordance with the present invention. As shown in FIG. 1, a scanning or information sensing unit 10 is provided for vertically scanning a light beam across a coded retroreflective label 12 affixed to the side of a vehicle 14. An exemplary form of the label 12 is shown in FIG. 2, to be described in detail hereinafter, and includes a plurality of orange, blue, and white retroreflective stripes, and black nonretroreflective stripes arranged in selected two-stripe code combinations to represent the identity or other information pertaining to the vehicle 8. The scanning unit 10 typically scans a vertical distance of about 9 feet such that the label 12 can be placed on the vehicle 8 anywhere within the vertical 9-foot distance and still be read by the scanning unit 10.

Light reflected from the label 12 is returned to and received by the scanning unit 10 and selectively converted thereby into coded electrical signals representative of the information encoded in the label 12. More particularly, an "orange-responsive" photocell OPC is provided in the scanning unit 10 for producing an output signal in response to light retroreflected from either an orange stripe or a white stripe of the label 12 (white retroreflected light including an "orange" component), and a "blue-responsive" photocell BPC is provided in the scanning unit 10 for producing an output signal in response to light retroreflected from either a blue stripe or a white stripe of the label 12 (white retroreflected light including a "blue" component). Thus, both photocells OPC and BPC are energized simultaneously to produce respective output signals in response to light retroreflected from a white stripe. Neither of the photocells OPC and BPC is energized to produce an output signal when a black stripe is scanned inasmuch, as previously stated, the black stripes are nonretroreflective.

The various output signals produced by the orange-responsive photocell OPC and the blue-responsive photocell BPC are applied for initial processing to a first signal processing arrangement 13 including a "near-depth" standardized circuit 15 and a "near-depth" loading logic circuit 16, and also to a second signal processing arrangement 14 including a "far-depth" standardizer circuit 17 and a "far-depth" loading logic circuit 18.

The near-depth standardizer circuit 15 and the near-depth loading logic circuit 16 are arranged so as to provide initial, optimal processing of coded signals received from the scanning unit 10 as a result of scanning a label presented to the scanning unit 10 from within a so-called "near-depth" range, for example, from within a range of 7—10 feet from the scanning unit 10. In a similar fashion, the far-depth standardizer circuit 17 and the far-depth loading logic circuit 18 are arranged so as to provide initial, optimal processing of coded signals received from the scanning unit 10 as a result of scanning a label presented to the scanning unit 10 from within a so-called "far-depth" range, for example, from within a range of 10—13 feet from the scanning unit 10. Both of the signal processing arrangements 13 and 14 are capable of providing initial processing of coded signals received from the scanning unit 10 as a result of scanning a label presented to the scanning unit 10 from the approximate center of the overall 7—13 foot range, for example, at approximately 9.5—10.5 feet.

Inasmuch as signals derived from a label present in the greater portion of the 10—13 foot range (more specifically, 10.5—13 feet) have an amplitude less (about half) than that of signals derived from a label present in the greater portion of the 7—10 foot range (more specifically, 7—9.5 feet), a pair of high-gain linear operational amplifiers OA are provided between the output connections of the orange-responsive and blue-responsive photocells OPC and BPC and the far-depth standardizer circuit 17 to amplify signals derived from a label present in the 10.5—13 foot range to equal the amplitude of signals derived from a label present in the 7—9.5 foot range.

As indicated in FIG. 1, the near-depth standardizer circuit 15 includes a pair of pulse-width detection circuits 15*b*, and the far-depth standardizer circuit 17 includes a pair of pulse-width detection circuits 17*b*. Two pulse-width detection circuits are employed in each of the near-depth and far-depth standardizer circuits 15 and 17 to provide separate pulse-width detection of the "orange" and "blue" signals produced by the orange-responsive and blue-responsive photocells OPC and BPC, respectively, during near-depth and far-depth operation. The purpose of the pulse-width detection circuits 15*b* and 17*b* is to eliminate most of the distortion of the electrical signals from the scanning unit 10, caused, for example, by such factors as the vibration or swaying of a vehicle as it passes the scanning unit 10, changes in optical focusing, irregularities or damage to the label itself due to weathering or dirt, or slight misalignment between the label and optical apparatus included within the scanning unit 10. The effects of the above factors is to cause undesirable wide variations in the rise time of the signals derived by the scanning unit 10 from a label presented to the scanning unit 10. As will be described in detail hereinafter, to eliminate the above-mentioned distortion of the signals from the scanning unit 10, the pulse-width detection circuits 15*b* and 17*b* measure the widths at the half-amplitude points of the individual signals received in succession from the scanning unit 10, these widths being independent of rise time or amplitude, and convert the signals measured at the half-amplitude points into pulses having a uniform, standardized amplitude. The standardized "orange" and "blue" output pulses from the near-depth standardizer circuit 15 are designated in FIG. 1 as $O_{ND}$ and $B_{ND}$, respectively. The standardized "orange" and "blue" output pulses from the far-depth standardizer circuit 17 are designated in FIG. 1 as $O_{FD}$ and $B_{FD}$, respectively.

As will be explained more fully hereinafter, during near-depth operation, the standardized pulses $O_{ND}$ and $B_{ND}$ may each have a first pulse width, corresponding to a single stripe of a label present in the near-depth range, or a second pulse width, corresponding to a stripe-pair of a label present in the near-depth range. Because all of the stripes comprising a label are of equal width, the theoretical ratio of the second pulse width to the first pulse width is, accordingly, 2:1. Similarly, during far-depth operation, the standardized pulses $O_{FD}$ and $B_{FD}$ may each have a first pulse width, corresponding to a single stripe of a label present in the far-depth range, or a second pulse width, corresponding to a stripe-pair of a label present in the far-depth range. Again, the theoretical ratio of the second pulse width to the first pulse width is 2:1. For a label present at the approximate center of the overall 7—13 foot range (approx. 9.5—10.5 feet), the standardized pulses $O_{ND}$ and $B_{ND}$ are of the same width as the standardized pulses $O_{FD}$ and $B_{FD}$, respectively.

The near-depth loading logic 16 and the far-depth loading logic 18 operate in response to standardized "orange" and "blue" output pulses from the respective standardizers 15 and 17 to generate successive appropriately timed loading signals for transferring the various standardized pulses from the respective standardizers 15 and 17, via respective near-depth and far-depth gating logic circuits 20 and 22, to output processing circuitry 24 for further processing. In FIG. 1, the loading signals produced by the near-depth loading logic circuit 16 are designated LOAD $1_{(ND)}$ and LOAD $2_{(ND)}$, and the loading signals produced by the far-depth loading logic circuit 18 are designated LOAD $1_{(FD)}$ and LOAD $2_{(FD)}$. The LOAD $1_{(ND)}$ signal is generated for loading "near-depth" standardized pulses of the first width (corresponding to a single stripe in the near-depth range) into the output processing circuitry 24 (via the near-depth gating logic circuit 20), and both the LOAD $1_{(ND)}$ and LOAD $2_{(ND)}$ signals are generated for loading the "near-depth" pulses of the second width (corresponding to a stripe-pair in the near-depth range) into the output processing circuitry 24 (again via the near-depth gating logic circuit 20). Similarly, the LOAD $1_{(FD)}$ signal is generated for loading "far-depth" pulses of the first width (corresponding to a single stripe in the far-depth range) into the output processing circuitry 24 (via the far-depth gating logic circuit 22), and both the LOAD $1_{(FD)}$ and LOAD $2_{(FD)}$ signals are generated for loading the "far-depth" pulses of the second width (corresponding to a stripe-pair in the far-depth range) into the output processing circuitry 24 (again via the far-depth gating logic circuit 22). Both of the gating logic circuits 20 and 22 are of a conventional, well-known form. As will become readily apparent hereinafter from a detailed description of the operation of the vehicle identification system 1 of FIG. 1, the timing of the LOAD $1_{(ND)}$ and the LOAD $2_{(ND)}$ signals with respect to each other and the timing of the LOAD $1_{(FD)}$ and the LOAD $2_{(FD)}$ signals with respect to each other are selected such that both of the loading logic circuits 16 and 18 are capable of processing standardized pulses derived from a label located at approximately 9.5—10.5 feet from the scanning unit 10.

The actual transfer of the standardized pulses from the near-depth and far-depth loading logic circuits 16 and 18 is accomplished by means of control signals applied in alternation to the near-depth and far-depth gating logic circuits 20 and 22. The alternating control signals applied to the gating logic circuits 20 and 22 are generated by an electro-optical arrangement 26 comprising a pair of series-connected photoresponsive devices PR1 and PR2 positioned in the path of light from the scanning unit 10, a light detector 28 coupled to the photoresponsive devices PR1 and PR2, and a toggle flip-flop circuit 30 coupled to the light detector circuit 28. Both of the photoresponsive devices PR1 and PR2 receive light from the scanning unit 10 during each scan of a label and, in response thereto, cause the light detector circuit 28 to produce an output pulse during each scan. The successive output pulses from the light detector circuit 28 alternately "toggle" the toggle flip-flop circuit 30 from a first stable state binary condition ("1" output) to a second stable state binary condition ("0" output). The "1" and "0" output signals from the toggle flip-flop circuit 30 alternately enable the near-depth and far-depth gating logic circuits 20 and 22.

A detailed description of the label 12 will now be presented, to be followed by a more detailed description of the operation of the coded vehicle identification system 1 of FIG. 1 taken in conjunction with FIGS. 2—6.

LABEL–FIG. 2

The coded retroreflective label 12, illustrated in detail in FIG. 2, is typically fabricated from a plurality of equal-width, rectangular, orange, blue, and white retroreflective stripes, and nonretroreflective black stripes. The orange, blue, and white retroreflective stripes have the capability of reflecting incident light directed thereon along the path of incidence whereas the black stripes effectively lack such a capability of retroreflection. The label 12, as shown in FIG. 2, is coded in a two-position base-four code format by various two-stripe combinations of the retroreflective orange, blue, and white stripes and the nonretroreflective black stripes to represent desired information pertaining to the vehicle on which the label 12 is affixed. For purposes of illustration only, the label 12 shown in FIG. 2 is encoded to represent a START control word, a plurality of digits 8507913624, a STOP control word, and a parity check integer.

Although 10 digits are encoded in a specific combination in the exemplary label 12 shown in FIG. 2, it is to be appreciated that a greater or lesser number of digits may be used for a particular application and arranged in any desired combination.

The value of the parity check integer corresponding to the above combination of digits 8507913624 is preferably calculated in accordance with a well-known system of parity designated the "powers-of-two modulo-11" system of parity. For the above values of digits (8507913624), the corresponding value of the parity check integer, as calculated in accordance with the "powers-of-two modulo-11" system of parity is 8. The "powers-of-two modulo-11" system of parity is described in detail in a copending Pat. application of Henry N. Weiss, entitled "Parity-Checking Apparatus for Coded Vehicle Identification Systems," Ser. No. 687,774, filed Dec. 4, 1967, now U.S. Pat. No. 3,524,163 and assigned to the same assignee as the present application.

The coded stripe-pairs of the label 12 are separated by black nonreflecting spacers and are surrounded on the edges by a black nonreflecting border. The purpose of the nonreflecting spacers is to isolate the stripe-pairs from each other so as to facilitate processing of the data encoded in the stripe-pairs. The nonreflecting border serves to isolate the stripes of the label 12 from the background on which the label 12 is affixed thereby to prevent unwanted reflections from the background from interfering with the proper reading of the label and from causing false triggering of the circuitry employed to process the data content of the label.

The START stripe-pair and the STOP stripe-pair, in response to being scanned, serve to respectively initiate and terminate processing of the data content of the label 12 as represented by the digits 8507913624. As may be noted from FIG. 2, the individual stripes of the START stripe-pair and the STOP stripe-pair are shorter than the other stripes of the label 12 and overlap each other at a central region of the label 12. The purpose of this arrangement is to initiate reading of the label 12 only when a significant part of the label is within the field of the scanning unit 10. In this fashion, any foreign matter which may be present on the vehicle adjacent to the vertical edges of the label 12 does not interfere with the proper reading of the label 12. Additionally, if the vertical edges of the label 12 become tattered or otherwise deteriorated, the staggered arrangement of the START and STOP stripe-pairs prevents a reading of the label 12 on either edge and therefore minimizes the occurrence of an improper reading of the label.

As may also be noted from FIG. 2, a number of black areas are included in the white stripes of the label 12. The black areas are nonreflecting and serve to reduce the reflectivity of the white stripes to essentially equal that of the colored stripes. The use of nonreflecting black areas is desirable inasmuch as completely white stripes have the tendency to reflect light having a greater amplitude than light reflected from the other stripes, the result being that signal processing by the standardizer circuits may be undesirably affected.

In a coded vehicle identification system which has operated satisfactorily, the vehicle-information label stripes (such as the code stripes for the digits 8507913624 in the above example) are 6 inches long and three-eighths inch wide, and the black nonreflecting spacers between the stripe-pairs are one-half inch wide. The individual stripes of the START and STOP stripe-pairs are each four inches long and overlap each other by approximately 2 inches so that the reading of the label is not initiated until approximately 2 inches of the label is in view of the scanning unit.

A detailed description of the operation of the vehicle identification system 1 of FIG. 1, taken in conjunction with FIGS. 2—6, will now be presented.

DETAILED DESCRIPTION OF OPERATION—FIGS. 1—6

Operation of Scanning Unit—FIG. 3

As a vehicle 8 bearing a coded retroreflective label, such as the label 12 shown in FIG. 2, is presented to the scanning unit 10, from within a range of distances of 7—13 feet, the label is scanned vertically from bottom to top by light from the scanning unit 10. The scanning unit 10, disclosed in greater detail in the aforementioned patent to Stites and Alexander, is shown schematically in FIG. 3 and includes a rotating wheel 40 having a plurality of reflective mirror surfaces 42 on its periphery, an optics assembly 44 including the aforementioned "orange-responsive" photocell OPC and the "blue-responsive" photocell BPC, and a light source 46. By way of example, the rotating wheel 40 may be 14 inches in diameter, have 15 reflective mirror surfaces 42 on its periphery, and rotate at 1200 revolutions per minute. In the operation of the scanning unit 10, as the vehicle 8 bearing the label 12 is presented to the scanning unit 10 from within the range of 7—13 feet, light from the light source 46 is initially directed by the optics assembly 44 onto the reflective mirror surfaces 42 of the rotating wheel 40. When a rotation motion is imparted to the rotating wheel 40 (as by a motor, not shown), the light received by the reflective mirror surfaces 42 is directed onto the label 12 through a transparent plastic or glass plate 47.

The light directed onto the label 12, as indicated in FIG. 3, is retroreflected by each of the retroreflective stripes of the label 12, as they are successively scanned, along the path of the incident light. The retroreflected light is returned by each retroreflective stripe, as it is scanned, onto the reflective mirror surfaces 42 of the rotating wheel 40 and then to the optics assembly 44. In the optics assembly 44, the return light is separated into its "orange" and "blue" components and applied to the orange-responsive and blue-responsive photocells OPC and BPC. As mentioned previously, in response to an orange stripe being scanned, the orange-responsive photocell OPC is operated to produce an output signal, and in response to a blue stripe being scanned, the blue-responsive photocell BPC is operated to produce an output signal. In response to a white stripe being scanned, both of the photocells OPC and BPC are operated to produce respective output signals, and in response to a black nonretroreflective stripe being scanned, neither of the photocells OPC and BPC is operated to produce an output signal.

The scanning unit 10 of FIG. 3 has been described here to the extent believed necessary to understand the present invention. However, for further or more specific details relating to the components of the scanning unit 10 and their operation, reference may be made to the aforementioned patent to Stites and Alexander.

The output signals selectively produced by the photocells OPC and BPC are applied directly to the near-depth standardizer circuit 15 and, also, after amplification by the pair of operation amplifiers OA, to the far-depth standardizer circuit 17. Suitable operational amplifiers which may be employed in the present invention are SA40 high-gain (about 2) linear operational amplifiers produced and sold by Sylvania Electric Products Inc.

"Near-Depth" Operation

Figures 4, 5:
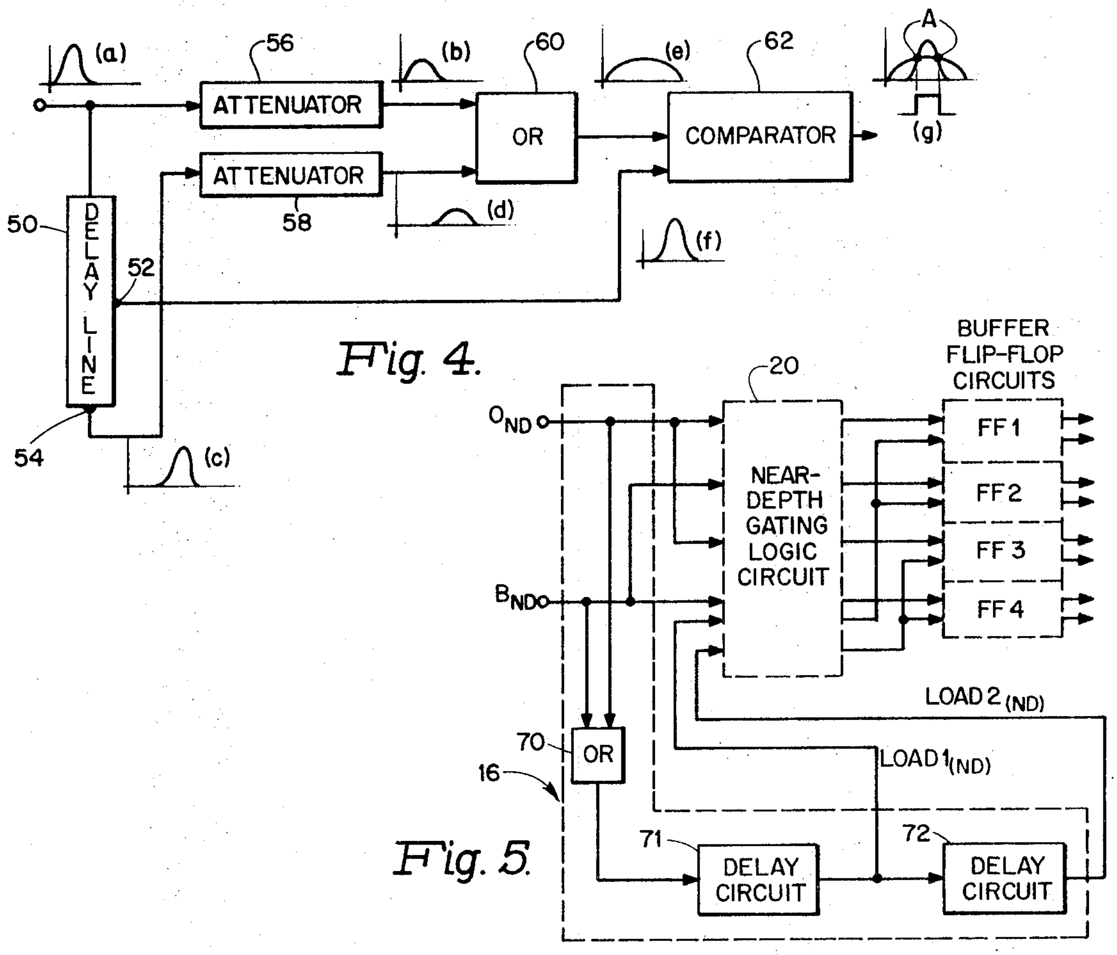
FIG. 4 is a diagrammatic representation in simplified block diagram form of a pulse-width detection circuit which may be employed in the coded vehicle identification system of FIG. 1.
FIG. 5 is a diagrammatic representation in simplified block diagram form of loading logic circuitry which may be employed in the coded vehicle identification system of FIG. 1.

Assuming that the label 12 is presented to the scanning unit 10 from within the near-depth range, that is, the 7—10 foot portion of the overall 7—13 foot range, the following action takes place in the near-depth standardizer circuit 15. The signals from the photocells OPC and BPC are applied directly to the pair of pulse-width detection circuits 15*b*, one of the pulse-width detection circuits 15*b*, as mentioned previously, being provided to pulse-width detect the "orange" signals from the orange-responsive photocell OPC, and the other pulse-width detection circuit being provided to pulse-width detect the "blue" signals from the blue-responsive photocell BPC. A suitable pulse-width detection circuit which may be used in each of the "orange" and "blue" near-depth data channels to pulse-width detect the "orange" and "blue" signals from the photocells OPC and BPC is shown in FIG. 4 and represents a modified version of a pulse-width detection circuit disclosed in U.S. Pat. No. 3,299,271 to Francis H. Stites, assigned to the same assignee as the present application. Thus, the following discussion relative to FIG. 4 is limited to the extent believed necessary to understand the present invention and to point out the manner in which the pulse-width detection circuit described in the aforementioned patent to Stites is modified for use in the present invention. For further or more specific details than presented herein, therefore, reference should be made to the patent to Stites.

As shown in FIG. 4, the pulse-width detection circuit comprises: a delay line 50 having a first output tap 52 at the center thereof and a second output tap 54 at the far end thereof, the amount of delay provided at the output tap 54 being twice that provided at the center output tap 52; a pair of attenuators 56 and 58 designed to attenuate or reduce by half the amplitudes of respective signals applied thereto; an OR gate 60; and a comparator 62. In the operation of the pulse-width detection circuit shown in FIG. 4, an input signal received from the orange-responsive photocell OPC or the blue-responsive photocell BPC, having a typical waveform such as shown at (*a*) in FIG. 4, is applied to the attenuator 56 and also to the delay line 50. The attenuator 56 attenuates the input signal and applies the attenuated input signal, waveform (*b*), to a first input terminal of the OR gate 60. The delay line 50 provides a delayed version of the input signal at the output tap 54, waveform (*c*), which is then attenuated by the attenuator 58, waveform (*d*), and applied to a second input terminal of the OR gate 60. As is well known, an OR gate produces an output signal when a signal is applied to either of its input terminals. Accordingly, the output signal of the OR gate 60 is a signal of half the amplitude of the input signal, because of the attenuation provided by the attenuators 56 and 58, and which is wider than the input signal by the amount of the delay provided by the delay line 50.

The resulting "stretched" output signal from the OR gate 60, waveform (*e*), is applied to a first input terminal of the comparator 62, and the delayed signal appearing at the center output tap 52, waveform (*f*), is applied, without attenuation, to a second input terminal of the comparator 62. For most effective operation, the total time delay of the delay line 50 should be approximately equal to the longest expected rise time of an input signal so that the "stretched" output signal from the OR gate 60 reaches its full amplitude before the delayed signal appearing at the center output tap 52 reaches its half amplitude. For the near-depth standardizer circuit 15 under discussion, a total delay of approximately 12 microseconds is satisfactory. With the indicated 12 microsecond delay time, the delayed signal at the center output tap 52, waveform (*d*), starts 6 microseconds after the start of the "stretched" output, waveform (*e*), and terminates 6 microseconds before the end of the "stretched" output signal.

The comparator 62 operates to determine the difference between the "stretched" output signal from the OR gate 60 and the delayed signal appearing at the center output tap 52, waveform (*f*), and produces an output signal the width of which is determined by the crossover points of the compared signals, the crossover points being indicated at points A in FIG. 4. The crossover points occur at the half-amplitude points of the leading and trailing edges of the delayed signal, (waveform (*f*)), regardless of its amplitude. This result is achieved by setting a threshold level in the comparator 62 by the "stretched" output signal from the OR gate 60 which, it will be recalled, is half the amplitude of the input signal. Thus, the delayed signal appearing at the center output tap 52 triggers the comparator 62 when its leading and trailing edges pass the threshold level. The output signal from the comparator 62 is a rectangular pulse, waveform (*g*), clipped near the level of the threshold, and having a width determined by the points at which the leading and trailing edges of a signal (waveform (*f*)) pass the threshold.

The fact that the signal at the center output tap 52 starts 6 microseconds after the leading edge of the "stretched" signal, waveform (*e*), and ends 6 microseconds before the trailing edge of the "stretched" signal, affords what is termed "guard-bands" which prevent small amplitude signals occurring in the 6 microsecond periods preceding and following the delayed signal, (waveform (*f*)), from producing an output from the comparator 62. Such signals as might occur during these periods would primarily be due to unwanted and undesirable reflection from the black nonreflecting spacers separating the two-stripe combinations of a label and typically caused by dirt or other foreign matter which may undesirably deposit on the back spacers.

In FIG. 1, each of the output pulses from the pulse-width detection circuits 15*b* of the near-depth standardizer circuit 15, designated $O_{ND}$ and $B_{ND}$, may have a first width, corresponding to a single stripe of a label present in the near-depth range, or a second width, corresponding to a stripe-pair of a label present in the near-depth range, the ratio of the second pulse width to the first pulse width being approximately 2:1. For example, the "orange" pulse-width detection circuit 15*b* provides a standardized output pulse $O_{ND}$ having the first width in response to an orange-black or white-black stripe-pair being scanned by the scanning unit 10 while present in the near-depth range, and a standardized output pulse $O_{ND}$ having the second width in response to an orange-orange or white-white stripe-pair being scanned by the scanning unit 10 while present in the near-depth range. Typical values for the first and second pulse widths of the standardized output pulses $O_{ND}$ and $B_{ND}$ are 10—20.5 microseconds and 22—43 microseconds, respectively. The standardized output pulses $O_{ND}$ and $B_{ND}$ are applied to the near-depth loading logic circuit 16 for further processing.

A suitable loading logic circuit which may be used to process the standardized output pulses $O_{ND}$ and $B_{ND}$ is shown in FIG. 5 and represents a modified version of a loading logic circuit described in detail in the aforementioned patent of Stites and Alexander. Therefore, the following discussion relative to FIG. 5 is limited to the extent believed necessary to understand the present invention and to point out the manner in which the loading logic circuit described in the patent to Stites and Alexander is modified for use in the present invention. For further or more specific details than presented herein, therefore, reference should be made to the patent to Stites and Alexander.

As shown in FIG. 5, the near-depth loading logic circuit 16 comprises an OR gate 70, and first and second series-connected delay circuits 71 and 72, for example, conventional one-shot multivibrators. The delay values of the delay circuits 71 and 72 are selected to produce successive loading signals, designated LOAD $1_{(ND)}$ and LOAD $2_{(ND)}$, for selectively loading the standardized output pulses $O_{ND}$ and $B_{ND}$ from the near-depth standardizer circuit 15, (via the near-depth gating logic circuit 20), into a plurality of buffer flip-flop circuits FF1—FF4 included in the output processing circuitry 24 (noting FIG. 6). More particularly, the LOAD $1_{(ND)}$ signal causes the standardized "orange" and/or "blue" pulses ($O_{ND}$, $B_{ND}$) corresponding to a first stripe of a stripe-pair (in the near-depth range) to be entered and stored in a first pair of the buffer flip-flop circuits, FF1 and FF2, and the LOAD $2_{(ND)}$ signal causes the standardized "orange" and/or "blue" pulses corresponding to the second stripe of the stripe-pair to be entered and stored in a second pair of the buffer flip-flop circuits, FF3 and FF4. For a nonreflective black code stripe, no signals are loaded into the corresponding pair of buffer flip-flop circuits.

As previously mentioned, each of the standardized pulses $O_{ND}$ and $B_{ND}$ may have a first width (10—20.5 microseconds) or a second width (22—43 microseconds) when a label is presented to the scanning unit 10 from within the near-depth range. To load these pulses of these two possible widths into the buffer flip-flop circuits FF1—FF4, the first delay circuit 71 is operated by the leading edge of one or both of the pulses $O_{ND}$ and $B_{ND}$ (of first or second width), via the OR gate 70, to produce the LOAD $1_{(ND)}$ signal at a time shortly after the leading edge of the pulse $O_{ND}$ and/or $B_{ND}$; the second delay circuit 72 is operated by the trailing edge of the LOAD $1_{(ND)}$ signal to produce the LOAD $2_{(ND)}$ signal at a time which is later than the occurrence of the trailing edge of a pulse $O_{ND}$ and/or $B_{ND}$ of the first width, but before the occurrence of the trailing edge of a pulse $O_{ND}$ and/or $B_{ND}$ of the second width. In other words, a standardized pulse $O_{ND}$ and $B_{ND}$ of the first width is sampled once, by the LOAD $1_{(ND)}$ signal, and a standardized pulse $O_{ND}$ or $B_{ND}$ of the second width is sampled twice, by both the LOAD $1_{(ND)}$ and the LOAD $2_{(ND)}$ signals. For "near-depth" operation, the delay values of the first delay circuit 71 and the second delay circuit 72 may be 7.5 microseconds and 14.5 microseconds, respectively, these values accordingly providing a time differential between the LOAD $1_{(ND)}$ signal and the LOAD $2_{(ND)}$ signal of 14.5 microseconds, a time differential sufficient to accommodate the respective ranges of values for the first pulse width (10—20.5 microseconds) and the second pulse width (22—43 microseconds).

In the discussion to this point of the near-depth standardizer circuit 15 and the associated near-depth loading logic circuit 16, it has been assumed that the label 12 is present in the near-depth range (7—10 feet) and that the signals processed by the near-depth standardizer circuit 15 and the near-depth loading logic circuit 16 are those derived from the label while present in the near-depth range. However, it is to be appreciated that when a label is presented to the scanning unit 10 from within the greater part of the far-depth range, for example, 10.5—13 feet, signals are derived therefrom by the scanning unit 10 and applied to the near-depth standardizer circuit 15 and the near-depth loading logic circuit 16. In this case, these signals are "-processed" by the near-depth standardizer circuit 15 and by the near-depth loading logic circuit 16, but incorrectly, due to the fact that the signals are narrower than the signals that the near-depth standardizer circuit 15 and the near-depth loading logic circuit 16 are adapted to process optimally, and applied to the near-depth gating logic 20. However, as will be explained hereinafter in connection with the description of the electro-optical arrangement 26 of FIGS. 1 and 3 and the output processing circuitry 24 of FIG. 6, these incorrectly processed signals, when gated into the output processing circuitry 24 by the electro-optical arrangement 26, are caused to be rejected from the system by specific circuitry included in the output processing circuitry 24.

"Far-Depth" Operation

When the label 12 is presented to the scanning unit 10 from within the far-depth portion (10—13 feet) of the overall 7—13 foot depth of field, the operation of the far-depth standardizer circuit 17 and the far-depth loading logic circuit 18 is as follows. The far-depth "orange" and "blue" signals derived by the scanning unit 10 are applied to the operational amplifiers OA and amplified therein. After amplification, the "orange" and "blue" far-depth signals are applied to the respective pulse-width detection circuits 17*b* and pulse-width processed therein. Each of the pulse-width detection circuits 17*b* is similar in arrangement and in operation to the pulse-width detection circuit shown in FIG. 4. However, the value of the delay line 50 in FIG. 4 is selected for "far-depth" operation to accommodate the relatively narrow pulse widths of the "far-depth" signals produced by the scanning unit 10. A suitable delay value of the delay line 50 for far-depth operation is 10 microseconds, this value providing "guard-bands" of 5 microseconds duration each in the manner previously described. With this particular arrangement, the standardized output pulses $O_{FD}$ and $B_{FD}$ may each have a first pulse width of 7.5—14.5 microseconds, corresponding to a single stripe of the label 12 present in the far-depth range, or a second pulse width of 17—29.5 microseconds, corresponding to a stripe-pair of the label 12 present in the far-depth range. It is to be noted that, as with the ranges of values of pulse widths of the pulses $O_{ND}$ and $B_{ND}$, the foregoing ranges of values of pulse widths of the pulses $O_{FD}$ and $B_{FD}$ also bear a ratio to each other of approximately 2:1. It is to be noted further that a certain amount of "overlap" is provided in the respective first pulse widths of the standardized near-depth and far-depth pulses (2.5 microseconds) and also in the respective second pulse widths of the standardized near-depth and far-depth pulses (5 microseconds), to allow both of the standardizer circuits 15 and 17 to process signals derived by the scanning unit 10 from label located approximately 9.5—10.5 feet from the scanning unit 10.

The far-depth loading logic circuit 18 is similar in arrangement and in operation to the near-depth loading logic circuit 16 of FIG. 5. However, for far-depth operation, the value of the second delay circuit 72 in FIG. 5 is changed to alter the time of occurrence of the second load signal LOAD $2_{(FD)}$ with respect to the first load signal LOAD $1_{(FD)}$ to accommodate the relatively narrow pulse widths produced during "far-depth" operation. A suitable value of delay for the second delay circuit 72 is 9.5 microseconds, the values of the first and second delay circuits 71 and 72 (7.5 microseconds and 9.5 microseconds, respectively) in this case providing a time differential between the LOAD $1_{(FD)}$ and LOAD $2_{(FD)}$ signals of 9.5 microseconds, a time differential sufficient to accommodate the respective range of values for the first far-depth pulse width (7.5—14.5 microseconds) and the second far-depth pulse width (17—29.5 microseconds).

The foregoing discussion of the operation of the far-depth standardizer circuit 17 and the associated far-depth loading logic circuit 18 assumes that the label 12 is presented to the scanning unit 10 from within the far-depth range. However, when a label is presented to the scanning unit 10 from within the greater part of the near-depth range, for example, from 7—9.5 feet, signals are derived therefrom by the scanning unit 10 and applied to the far-depth standardizer circuit 17 and the far-depth loading logic circuit 18. In this case, these signals are "processed" by the far-depth standardizer circuit 17 and the far-depth loading logic circuit 18, but incorrectly, due to the fact that the signals are wider than the signals the far-depth standardizer circuit 17 and the far-depth loading logic circuit 18 are arranged to process optimally, and applied to the far-depth gating logic circuit 22. However, as in the case of far-depth signals incorrectly processed by the near-depth standardizer circuit 15 and the near-depth loading logic circuit 16, these incorrectly processed signals, when gated into the output processing circuitry 24, are caused to be rejected from the system by specific circuitry included in the output processing circuitry 24.

Electro-Optical Arrangement—FIGS. 1 and 3

The pulses $O_{ND}$ and $B_{ND}$ from the near-depth loading logic circuit 16 and the pulses $O_{FD}$ and $B_{FD}$ from the far-depth loading logic circuit 18 are applied to the output processing circuitry 24 upon the respective near-depth and far-depth gating logic circuits 20 and 22 being enabled by the electro-optical arrangement 26. FIG. 3 illustrates in greater detail than FIG. 1 the nature of the electro-optical arrangement 26.

As shown in FIG. 3, the photoresponsive devices PR1 and PR2 are positioned on the glass or plastic plate 47 (as by an adhesive) so as to be illuminated by the light directed toward the label 12 by each of the reflective mirror surfaces 42. Preferably, the photoresponsive devices PR1 and PR2 are positioned on the plate 47 so as to be illuminated during the top portion or the bottom portion of each light scan provided by each reflective mirror surface 42. The two photoresponsive devices PR1 and PR2, which may be solar cells, are connected in series opposition with the positive terminals being connected together and the negative terminals being connected to the light detector circuit 28.

The negative terminal of the photoresponsive device PR1 is connected directly to ground potential and the negative terminal of the photoresponsive device PR2 is directly connected to the emitter electrode of an NPN switching transistor $Q_1$. The base electrode of the switching transistor $Q_1$ is connected to the juncture of a pair of voltage divider resistors $R_1$ and $R_2$, the opposite end of the resistor $R_1$ being connected to ground potential and the opposite end of the resistor $R_2$ being connected to a positive voltage source +B. The collector electrode of the switching transistor $Q_1$ is coupled to the positive voltage source +B via a resistor $R_3$ and also directly to the base electrode of an NPN transistor $Q_2$ arranged in an emitter-follower configuration. The collector electrode of the transistor $Q_2$ is coupled to the positive voltage source +B via a current-limiting resistor $R_4$, and the emitter electrode is directly connected to the toggle flip-flop circuit 30.

In the quiescent operating condition, the photoresponsive devices PR1 and PR2 are both exposed to ambient light conditions and any voltages developed across the photoresponsive devices PR1 and PR2 cancel each other because of the series opposing arrangement of the two photoresponsive devices. Under these conditions, the voltage divider resistors $R_1$ and $R_2$ and the positive voltage source +B maintain the base-emitter potential of the switching transistor $Q_1$ at a positive value such that the transistor $Q_1$ is forward-biased in its conducting condition. With the switching transistor $Q_1$ operating in its conducting condition, the base-emitter potential of the transistor $Q_2$ is low and, accordingly, the transistor $Q_2$ is reverse-biased in its nonconducting condition. As a result, the emitter electrode of the transistor $Q_2$ is at approximately ground potential and the toggle flip-flop circuit 30 is not actuated.

In the nonquiescent operating condition, as light from one of the reflective mirror surfaces 42 of the rotating wheel 40 illuminates instantaneously the first photoresponsive device PR1, as the label 12 is scanned, a positive voltage is produced across the photoresponsive device PR1 (that is, the photoresponsive device PR1 acts like a positive battery source), and the potential at the emitter electrode of the switching transistor $Q_1$ becomes sufficiently positive with respect to the base electrode to reverse-bias the transistor $Q_1$ in its nonconducting condition. The base-emitter potential of the emitter-follower transistor $Q_2$ accordingly becomes sufficiently positive to be forward-biased into its conducting condition. As a result, the leading edge of a square wave pulse P is produced at the emitter electrode thereof. As the light from the reflective mirror surface continues to move past the first and second photoresponsive devices PR1 and PR2, such that both of the photoresponsive devices PR1 and PR2 are now simultaneously exposed, opposing voltages are produced across the photoresponsive devices PR1 and PR2 (that is, both of the photoresponsive devices PR1 and PR2 act as opposing positive and negative battery sources, respectively) and the opposing voltages cancel out each other. As a result, the transistors $Q_1$ and $Q_2$ are returned to their quiescent operating conditions and the trailing edge of the output pulse P is produced at the emitter electrode of the emitter-follower transistor $Q_2$.

As the light from the reflective mirror surface moves past the first photoresponsive device PR1 such that only the second photoresponsive device PR2 is now illuminated, a negative voltage is developed across the photoresponsive device PR2. However, this negative voltage serves only to render the voltage at the emitter electrode of the transistor $Q_1$ more negative with respect to the base electrode and to keep the transistor $Q_1$ in its conducting condition.

By way of a specific example, the photoresponsive devices PR1 and PR2 may be silicon solar cells of a type SS23-L, Solar Systems, Inc., having a nominal resistance of 308 ohms. The switching transistor $Q_1$ may be of a type 2N3565 and the emitter-follower transistor $Q_2$ may be of a type 2N3566. The resistors $R_1$—$R_4$ may have respective values of 1.3 kilohms, 3.9 kilohms, 5 kilohms, and 75 ohms.

With each scan of a label by each of the reflective mirror surfaces 42 of the rotating wheel 40, a pulse such as shown at P in FIG. 3 is produced and applied to the toggle flip-flop circuit 30 to cause alternating output control signals to be produced at the "1" and "0" output terminals. The successive output control signals from the toggle flip-flop circuit 30 enable in alternation the near-depth gating logic circuit 20 and the far-depth gating logic circuit 22. Thus, if the near-depth gating logic circuit 20 is enabled while "near-depth" pulses are applied thereto by the near-depth loading logic circuit 16, the near-depth pulses are transferred to the output processing circuitry 24 for further processing. Similarly, if the far-depth gating logic circuit 22 is enabled while far-depth pulses are applied thereto by the far-depth loading logic circuit 18, the far-depth pulses are transferred to the output processing circuitry 24 for further processing. For a label located at approximately 9.5—10.5 feet from the scanning unit 10, the signals derived therefrom and processed by both of the signal processing arrangements 13 and 14 are gated through one of the gating logic circuits 20 and 22, namely, the one enabled at the time by the toggle flip-flop circuit 30. It is to be noted, however, that due to the fact that the scanning unit 10 and the electro-optical arrangement 26 are unable to tell whether a label is specifically present in the near-depth range or in the far-depth range, it is possible, during a single, given scanning operation, for the near-depth gating logic circuit 20 to be enabled when a label is, in fact, present in the far-depth range and correspondingly far-depth signals are derived therefrom or, conversely, for the far-depth gating logic circuit 22 to be enabled when a label is, in fact, present in the near-depth range and corresponding near-depth signals derived therefrom.

In the above cases, the far-depth signals incorrectly "-processed" by the near-depth standardizer circuit 15 and the associated near-depth loading logic circuit 16 are gated by a control signal from the toggle flip-flop circuit 30 through the near-depth gating logic circuit 20 to the output processing circuitry 24, and the near-depth signals incorrectly "processed" by the far-depth standardizer circuit 17 and the associated far-depth loading logic circuit 18 are gated by a control signal from the toggle flip-flop circuit 30 through the far-depth gating logic circuit 22 to the output processing circuitry 24. As will be described hereinafter in connection with FIG. 6, these incorrectly processed signals are rejected by specific circuitry included in the output processing circuitry 24. However, to presently correct for each of the above situations, a second "-pass" is made by the scanning unit 10 to read the label and the signals derived therefrom are correctly processed as the proper gating logic circuit is enabled by the next control signal from the toggle flip-flop circuit 30. That is, if the near-depth gating logic circuit 20 is enabled by a control signal from the toggle flip-flop circuit 30 when a label is present in the far-depth range, or if the far-depth gating logic circuit 24 is enabled by a control signal from the toggle flip-flop circuit 30 when a label is present in the near-depth range, the correct signals are derived during the next, second "pass" and properly gated by the next control signal from the toggle flip-flop circuit 30 through the appropriate gating logic circuit to the output processing circuitry 24.

Figure 6:
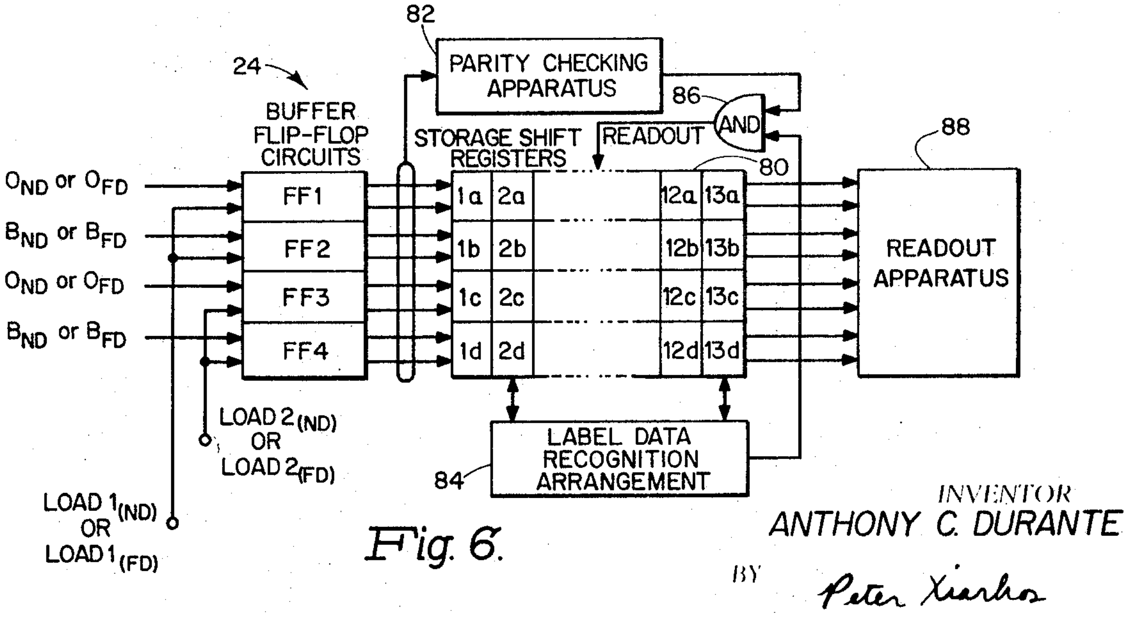
FIG. 6 is a diagrammatic representation in simplified block diagram form of output processing circuitry which may be employed in the coded vehicle identification system of FIG. 1.

Output Processing Circuitry—FIG. 6

The output processing circuitry 24 is shown in greater detail in FIG. 6. As shown therein, the output processing circuitry 24 comprises the aforementioned buffer flip-flop circuits FF1—FF4, a plurality of storage shift registers 80, a parity checking apparatus 82, a label data recognition arrangement 84, an AND gate 86, and an output apparatus 88. The storage shift registers 80 comprise a plurality of sets of stages, designated 1*a*—1*d*, 2*a*—2*d*,...12*a*—12*d*, 13*a*—13*d*, interconnected in a manner disclosed in the aforementioned patent to Stites and Alexander, so as to individually and successively store the pulses derived as a result of scanning the START stripe-pair, the digit stripe-pairs (8507913624), the STOP stripe-pair, and the parity integer stripe-pair (FIG. 2).

In the operation of the output processing circuitry 24, the near-depth or far-depth pulses loaded into the buffer flip-flop circuits FF1—FF4 by loading signals from the near-depth loading logic circuit 16 or the far-depth loading logic circuit 18, respectively, are applied and stored in succession in the sets of stages 1*a*—1*d*...13*a*—13*d* of the storage shift registers 80. The signals corresponding to the START code word of the label 12 are stored first in the stages 1*a*—1*d*, and shifted successively through the remaining sets of stages 2*a*—2*d*...13*a*—13*d* by the signals corresponding to the remaining coded stripe-pairs of the label. Thus, at the termination of a label reading operation, the signals corresponding to the START stripe-pair are stored in the last set of stages 13*a*—13*d*, the signals corresponding to the digit stripe-pairs 8507913624 are stored in the sets of stages 3*a*—3*d*...12*a*—12*d*, the signals corresponding to the STOP stripe-pair are stored in the set of stages 2*a*—2*d*, and the signals corresponding to the parity check integer stripe-pair are stored in the first set of stages 1*a*—1*d*.

The signals applied in succession to the storage registers 80 are also applied in succession to the parity checking apparatus 82. A parity checking apparatus suitable for use in the present invention is described in the aforementioned patent of Henry N. Weiss. The parity checking apparatus 82 performs various mathematical operations on the signals received thereby to calculate the value of the parity check integer corresponding to the values of the signals (in accordance with the "powers-of-two modulo-11" system of parity), and compares this calculated value of parity with the value (8) of the signal corresponding to the parity check integer encoded in the label 12. If the two values are the same, an output signal is produced and applied to a first input terminal of the AND gate 86. If the two values of parity are not the same, as occurs for incorrectly processed signals, for example, no output signal is produced thereby and applied to the AND gate 86.

The signals stored in the storage shift registers 80 are also tested by the label data recognition arrangement 84. Typically, the label data recognition arrangement 84, a suitable implementation of which is disclosed in the aforementioned patent to Stites and Alexander, includes a first signal-sensing gating arrangement for detecting the presence in the last set of stages 13*a*—13*d* of the storage shift registers 80 of the signals corresponding to the START stripe-pair, and a second signal-sensing gating arrangement for detecting the presence in the second set of stages 2*a*—2*d* of the signals corresponding to the STOP stripe-pair. In response to simultaneously detecting both of these sets of signals in their proper locations in the storage shift registers 80, an output signal is produced by the label data recognition arrangement 84 and is applied to a second input terminal of the AND gate 86. If the signals present in the last set of stages 13*a*—13*d* and in the second set of stages 2*a*—2*d* do not correspond to the START and STOP stripe-pairs, respectively, as occurs for incorrectly processed signals, for example, no output signal is produced by the label data recognition arrangement 84 and applied to the AND gate 86.

The AND gate 86, in response to receiving signals in coincidence from the parity checking apparatus 82 and the label data recognition arrangement 84, thereby indicating that the signals stored in the storage shift registers 80 satisfy system parity requirements and pertain to valid label data, produces a READOUT signal to cause the signals stored in the registers 80 to be applied to the readout apparatus 88. If the signals stored in the registers 80 do not satisfy system parity requirements or do not pertain to valid label data (spurious "noise" signals, for example), the AND gate 86 does not receive signals coincidentally at its input terminals and, hence, no READOUT signal is produced and the signals stored in the registers 80 are not applied to the readout apparatus 88. The readout apparatus 88 typically includes local or remote computer, display, or printout apparatus.

From the above discussion of the output processing circuitry 24, it is apparent that any incorrectly processed signals transferred through either of the gating logic circuits 20 and 22 to the output processing circuitry 24 are rejected by the parity checking apparatus 82 and the label data recognition arrangement 84. Thus, if the near-depth gating logic circuit 20 is enabled by a control signal from the toggle flip-flop circuit 30 when a label is present in the 10.5—13 foot portion of the far-depth range, the signals derived from the label while in the 10.5—13 foot portion of the far-depth range and incorrectly processed by the near-depth standardizer circuit 15 and the near-depth loading logic circuit 16 are rejected by the parity checking apparatus 82 and the label data recognition arrangement 84. Similarly, if the far-depth gating logic circuit 22 is enabled by the toggle flip-flop circuit 30 when a label is present in the 7.5—10 foot portion of the near-depth range, the signals derived from the label while in the 7.5—10 foot portion of the near-depth range and incorrectly processed by the far-depth standardizer circuit 17 and the far-depth loading logic circuit 18 are rejected by the parity checking apparatus 82 and the label data recognition arrangement 84.

Modifications

Although a specific two-range coded vehicle identification system has been described hereinabove, it is to be appreciated that a coded vehicle identification system having three or more ranges may be constructed in accordance with the teachings of the present invention. For example, for a three-range system, three signal processing arrangements may be provided (such as shown at 13 and 14 in FIG. 1), each adapted to process optimally the signals derived from a label present in a corresponding one of the three ranges, and three gating logic circuits may be provided, one associated with each of the three signal processing arrangements. In this case, the toggle flip-flop circuit 30, as shown in FIG. 1, may be replaced by a three-output ring counter circuit or equivalent apparatus. It is to be noted, however, that for a three-range system, a vehicle passing the scanning unit 10 must be moving sufficiently slowly to enable the scanning unit 10 to make three "passes" at the label affixed thereto to ensure that the label is read by one of the three scans.

It is also to be appreciated that an arrangement other than the specific electro-optical arrangement 26 shown in FIG. 1 may be employed in the present invention. For example, instead of using the specific combination of the photoresponsive devices PR1 and PR2, the light detector circuit 28, and the toggle flip-flop circuit 30 of FIG. 1, a magnet may be attached to each reflective mirror surface 42 of the rotating wheel 40 (FIG. 3) for operating a field-sensing circuit once during each scan cycle. The field-sensing circuit then causes successive operation of a toggle flip-flop circuit (or ring counter for three or more ranges of operation).

Further, although a vehicle identification system has been disclosed which utilizes a coded retroreflective label, a specific two-position base-four coding format, and visible light, it is to be appreciated that the features of the present invention may be employed in systems involving objects other than vehicles, types of labels other than retroreflective labels, types of code formats other than a two-position base-four coding format, and forms of electromagnetic radiation other than visible light.

What I claim is:

1. A system for processing information encoded in a label, comprising:

information sensing means operative to sense the information encoded in the label and to produce electrical signals representative thereof;

first signal processing means coupled to the information sensing means for processing in a first predetermined manner the signals produced by the information sensing means;

second signal processing means coupled to the information sensing means for processing in a second predetermined manner the signals produced by the information sensing means;

additional signal processing means for processing further the signals processed by the first signal processing means or the second signal processing means;

first gating means coupled to the first signal processing means and to the additional signal processing means for receiving the signals processed by the first signal processing means and operative in response to a control signal to gate said signals to the additional signal processing means;

second gating means coupled to the second signal processing means and to the additional signal processing means for receiving the signals processed by the second signal processing means and operative in response to a control signal to gate said signals to the additional signal processing means; and control signal generating means for generating a control signal while the information sensing means operates to sense the information encoded in the label and for applying the control signal to the first gating means or to the second gating means to cause the processed signals received thereby to be gated to the additional processing means.

2. A system in accordance with claim 1 wherein the additional signal processing means comprises:

storage means for storing the signals gated by the first gating means or the second gating means;

output apparatus; and means coupled to the storage means for examining the signals stored in the storage means to determine whether said signals satisfy certain preestablished criteria for valid label-derived signals, and operative to cause the signals stored in the storage means to be applied to the output apparatus if said signals satisfy said preestablished criteria.

3. A system for processing information encoded in a label, comprising:

information sensing means operative to sense repetitively the information encoded in the label and to produce electrical signals representative thereof;

first signal processing means coupled to the information sensing means for processing in a first predetermined manner the signals produced by the information sensing means;

second signal processing means coupled to the information sensing means for processing in a second predetermined manner the signals produced by the information sensing means;

additional signal processing means for processing further the signals processed by the first signal processing means or the second signal processing means;

first gating means coupled to the first signal processing means and to the additional signal processing means for receiving the signals processed by the first signal processing means and operative in response to a control signal to gate said signals to the additional signal processing means;

second gating means coupled to the second signal processing means and to the additional signal processing means for receiving the signals processed by the second signal processing means and operative in response to a control signal to gate said signals to the additional signal processing means; and control signal generating means for generating a control signal corresponding to each operation of the information sensing means to sense information from a label and for applying the control signals in succession to the first and second gating means to cause the processed signals received thereby to be gated in succession to the additional signal processing means.

4. A system in accordance with claim 3 wherein the additional signal processing means comprises:

storage means for storing the signals gated by the first gating means or the second gating means;

output apparatus; and means coupled to the storage means for examining the signals stored in the storage means to determine whether said signals satisfy certain preestablished criteria for valid label-derived signals, and operative to cause the signals stored in the storage means to be applied to the output apparatus if said signals satisfy said preestablished criteria.

5. A system in accordance with claim 3 wherein:

the first signal processing means is adapted to process optimally signals produced by the information sensing means as a result of sensing information encoded in a label presented to the information sensing means from within a first range of distances from the information sensing means; and the second signal processing means is adapted to process optimally signals produced by the information sensing means as a result of sensing information encoded in a label presented to the information sensing means from within a second range of distances from the information sensing means.

6. A system in accordance with claim 5 wherein:

the first signal processing means comprises:

first pulse-width detection circuit means operative to measure the widths at predetermined amplitude points of the signals received from the information sensing means while a label is present in the first range of distances, and to produce output signals the widths of which correspond to the widths of the corresponding signals from the information sensing means at the predetermined amplitude points; and first loading logic circuit means responsive to each of the output signals from the first pulse-width detection circuit means to generate successive loading signals for loading the output signals from the first pulse-width detection circuit means into the additional signal processing circuitry when the first gating means is operated by a control signal from the control signal generating means, the duration of time between the successive loading signals being selected to accommodate the expected widths of output signals produced by the first pulse-width detection circuit means as a result of the information encoded in a label presented to the information sensing means being sensed while the label is present within the first range of distances; and the second signal processing means comprises:

second pulse-width detection circuit means operative to measure the widths at predetermined amplitude points of the signals received from the information sensing means while a label is present in the second range of distances, and to produce output signals the widths of which correspond to the widths of the corresponding signals from the information sensing means at the predetermined amplitude points; and second loading logic circuit means responsive to each of the output signals from the second pulse-width detection circuit means to generate successive loading signal for loading the output signals from the second pulse-width detection circuit means into the additional signal processing means when the second gating means is operated by a control signal from the control signal generating means, the duration of time between the successive loading signals being selected to accommodate the expected widths of output signals produced by the second pulse-width detection circuit means as a result of the information encoded in a label presented to the information sensing means being sensed while the label is present within the second range of distances.

7. A system in accordance with claim 5 wherein the control signal generating means comprises:

first circuit means operative in response to each operation of the information sensing means to sense information from a label to produce an output signal; and second circuit means operative in response to successive output signals from the first circuit means to apply control signals in alternation to the first and second gating means.

8. A system in accordance with claim 7 wherein:

the label comprises a plurality of radiation-reflecting elements arranged in a predetermined code format to represent information;

the information sensing means comprises:

scanning means for scanning the radiation-reflecting elements with an incident beam of electromagnetic radiation; and means arranged to receive electromagnetic radiation reflected from the radiation-reflecting elements and operative in response to electromagnetic radiation received after reflection from the radiation-reflecting elements to produce electrical signals representative of the information encoded in the plurality of radiation-reflecting elements;

the first circuit means comprises:

radiation-responsive means positioned with respect to the scanning means so as to be exposed to electromagnetic radiation from the scanning means during each operation of the scanning means to scan the radiation-reflecting elements comprising a label; and detector circuit means coupled to the radiation-responsive means and operable in response to the radiation-responsive means being exposed to electromagnetic radiation from the scanning means to produce an output signal; and the second circuit means includes a toggle flip-flop circuit means having an input connection for receiving output signals from the detector circuit means, a first output connection to the first gating means, and a second output connection to the second gating means, said toggle flip-flop circuit means being operative in response to successive output signals from the detector circuit means to produce and apply control signals in alternation to the first and second gating means over the respective first and second output connections.

9. A system in accordance with claim 8 wherein the radiation-reflecting elements are retroreflective elements, the electromagnetic radiation is visible light, and the radiation-responsive means is responsive to said visible light.

10. A system for processing information encoded in a label affixed to an object, said label comprising a plurality of radiation-reflecting code elements arranged in accordance with a predetermined code format to represent information pertaining to the object, said label being presented by said object to an information sensing means from within a first range of distances from the information sensing means or from within a second range of distances from the information sensing means, said system comprising:

information sensing means for repetitively sensing the information encoded in the plurality of radiation-reflecting elements comprising a label presented thereto from within the first range of distances or from within the second range of distances, and for producing electrical signals representative of the information encoded in the plurality of radiation-reflecting elements, said information sensing means comprising:

scanning means for repetitively scanning the radiation-reflecting elements comprising the label with an incident beam of electromagnetic radiation; and
means arranged to receive electromagnetic radiation reflected from the radiation-reflecting elements and operative in response to electromagnetic radiation received after reflection from the radiation-reflecting elements to produce electrical signals representative of the information encoded in the plurality of radiation-reflecting elements;
first signal processing means adapted to process optimally the signals produced by the information sensing means when a label is presented thereto from within the first range of distances and the information encoded in the plurality of radiation-reflecting elements comprising the label is sensed by the information sensing means;
second signal processing means adapted to process optimally the signals produced by the information sensing means when a label is presented thereto from within the second range of distances and the information encoded in the plurality of radiation-reflecting elements comprising the label is sensed by the information sensing means;
additional signal processing means for processing further the signals processed by the first signal processing means or the second signal processing means;
first gating means coupled to the first signal processing means and to the additional signal processing means for receiving the signals processed by the first signal processing means and operative in response to a control signal to gate said signals to the additional signal processing means;
second gating means coupled to the second signal processing means and to the additional signal processing means for receiving the signals processed by the second signal processing means and operative in response to a control signal to gate said signals to the additional signal processing means;
control signal generating means operative in response to successive operations of the information sensing means to sense the information encoded in the plurality of radiation-reflecting elements comprising a label presented thereto from within the first range of distances or from within the second range of distances to produce and apply successive control signals in alternation to the first and second gating means; and
said additional signal processing means comprises:
storage means for storing the signals gated by the first gating means or the second gating means;
output apparatus; and
means coupled to the storage means for examining the signals stored in the storage means to determine whether said signals satisfy certain preestablished criteria for valid label-derived signals, and operative to cause the signals stored in the storage means to be applied to the output apparatus if said signals satisfy said preestablished criteria.

11. A system in accordance with claim 10 wherein the control signal generating means comprises:
radiation-responsive means positioned with respect to the scanning means so as to be exposed to electromagnetic radiation during each operation of the scanning means to scan the radiation-reflecting elements comprising a label;
detector circuit means coupled to the radiation-responsive means and operable in response to the radiation-responsive means being exposed to electromagnetic radiation from the scanning means to produce an output signal; and
toggle flip-flop circuit means having an input connection for receiving output signals from the detector circuit means, a first output connection to the first gating means, and a second output connection to the second gating means, said toggle flip-flop circuit means being operative in response to successive output signals from the detector circuit means to produce and apply control signals in alternation to the first and second gating means over the respective first and second output connections.

12. A system in accordance with claim 10 wherein the radiation-reflecting elements are retroreflective elements and the electromagnetic radiation is visible light.

13. A system in accordance with claim 11 wherein
the code elements are selected from retroreflective stripes of a first color, a second color, and a third color, and nonreflecting stripes of a fourth color, said stripes being arranged in a vertical array of paired combinations of the stripes in accordance with a two-position base-four coding format;
and wherein the electromagnetic radiation is visible light; and the radiation-responsive means is responsive to said visible light.

14. A system in accordance with claim 13 wherein:
the array of paired combinations includes a parity paired combinations; and
the means coupled to the storage means comprises:
parity checking means for determining whether the signals applied to the storage means satisfy system parity requirements as established by a predetermined system of parity calculation; and
label data recognition means for determining whether the signals applied to the storage means pertain to valid label-derived data.